United States Patent
Takahashi (10) Patent No.: US 9,337,693 B2
(45) Date of Patent: May 10, 2016

(54) ROTARY ELECTRIC MACHINE WITH SEGMENT TYPE OF STATOR WINDING

(71) Applicant: DENSO CORPORATION, Kariya, Aichi-pref. (JP)

(72) Inventor: Yuki Takahashi, Obu (JP)

(73) Assignee: DENSO CORPORATION, Kariya (JP)

( * ) Notice: Subject to any disclaimer, the term of this patent is extended or adjusted under 35 U.S.C. 154(b) by 123 days.

(21) Appl. No.: 14/230,393

(22) Filed: Mar. 31, 2014

(65) Prior Publication Data

US 2014/0292119 A1  Oct. 2, 2014

(30) Foreign Application Priority Data

Mar. 29, 2013  (JP) .................................. 2013-073335

(51) Int. Cl.
| | |
|---|---|
| H02K 3/48 | (2006.01) |
| H02K 9/197 | (2006.01) |
| H02K 3/12 | (2006.01) |
| H02K 3/24 | (2006.01) |
| H02K 15/00 | (2006.01) |

(52) U.S. Cl.
CPC .. *H02K 3/12* (2013.01); *H02K 3/24* (2013.01); *H02K 15/0037* (2013.01); *H02K 3/48* (2013.01); *H02K 9/197* (2013.01)

(58) Field of Classification Search
CPC ............. H02K 3/12; H02K 3/24; H02K 3/48; H02K 9/197; H02K 15/0037
USPC .................................... 310/54, 201, 214, 215
IPC ............................................. H02K 3/48, 9/197
See application file for complete search history.

(56) References Cited

U.S. PATENT DOCUMENTS

| | | | |
|---|---|---|---|
| 5,936,326 | A | 8/1999 | Umeda et al. |
| 5,952,749 | A | 9/1999 | Umeda et al. |
| 5,955,810 | A | 9/1999 | Umeda et al. |
| 5,965,965 | A | 10/1999 | Umeda et al. |
| 5,982,068 | A | 11/1999 | Umeda et al. |
| 5,986,375 | A | 11/1999 | Umeda et al. |
| 5,994,813 | A | 11/1999 | Umeda et al. |
| 5,998,903 | A | 12/1999 | Umeda et al. |
| 6,011,332 | A | 1/2000 | Umeda et al. |
| 6,020,669 | A | 2/2000 | Umeda et al. |
| 6,051,906 | A | 4/2000 | Umeda et al. |
| 6,091,169 | A | 7/2000 | Umeda et al. |
| 6,097,130 | A | 8/2000 | Umeda et al. |
| 6,124,660 | A | 9/2000 | Umeda et al. |

(Continued)

FOREIGN PATENT DOCUMENTS

| | | |
|---|---|---|
| JP | 10-304608 | 11/1998 |
| JP | 11-164504 | 6/1999 |

(Continued)

*Primary Examiner* — John K Kim
(74) *Attorney, Agent, or Firm* — Nixon & Vanderhye P.C.

(57) ABSTRACT

In a rotary electric machine provided with a rotor and a stator, a wedge is inserted between in-slot portions stacked in each of slots of the stator and a wall of each of the slots. The wedge has two edges and a length ranging from one of the edges to the other. The length of the wedge is smaller than an axial length of the stator core. The wall is located oppositely to an opening of each slot. By inserting the wedge, both end portions of the conductors are tilted so as to be oriented oppositely to the rotor in the radial direction. The tilted end portions starts from each of the two edges of the wedge in the axial direction.

5 Claims, 8 Drawing Sheets

(56) References Cited

U.S. PATENT DOCUMENTS

| | | |
|---|---|---|
| 6,137,201 A | 10/2000 | Umeda et al. |
| 6,144,136 A | 11/2000 | Umeda et al. |
| 6,181,043 B1 | 1/2001 | Kusase et al. |
| 6,181,045 B1 | 1/2001 | Umeda et al. |
| 6,198,190 B1 | 3/2001 | Umeda et al. |
| 6,291,918 B1 | 9/2001 | Umeda et al. |
| 6,459,177 B1 | 10/2002 | Nakamura et al. |
| 6,459,186 B1 | 10/2002 | Umeda et al. |
| 6,756,712 B1 * | 6/2004 | Schuren ............... H02K 3/345 310/215 |
| 8,203,246 B2 * | 6/2012 | Nashiki ................. H02K 3/28 310/179 |
| 2009/0260217 A1 | 10/2009 | Kamakura et al. |
| 2009/0289518 A1 * | 11/2009 | Fujita ..................... H02K 1/16 310/201 |
| 2010/0213782 A1 * | 8/2010 | Nashiki ................. H02K 3/28 310/195 |
| 2010/0244615 A1 * | 9/2010 | Kouda ................... H02K 3/34 310/215 |
| 2012/0146447 A1 | 6/2012 | Seguchi et al. |
| 2012/0161569 A1 * | 6/2012 | Hisada ............. H02K 15/0081 310/201 |
| 2014/0292119 A1 * | 10/2014 | Takahashi .............. H02K 3/12 310/54 |

FOREIGN PATENT DOCUMENTS

| | | |
|---|---|---|
| JP | 2009-261189 | 11/2009 |
| JP | 2010-124637 | 6/2010 |
| JP | 2012-130093 | 7/2012 |
| JP | 2013-039001 | 2/2013 |
| WO | WO 2009/084473 | 7/2009 |

* cited by examiner

(SECTION ALONG IV-IV LINE)

FIG.5

[ h1 : ACTUAL AXIAL HEIGHT ACCORDING TO EMBODIMENT
H1 : AXIAL HEIGHT ACCORDING TO CONVENTIONAL ]

FIG.6
[COMPARATIVE EXAMPLE 1]
(W/O WEDGE)

FIG. 11
[SECOND EMBODIMENT]

FIG. 12
[COMPARATIVE EXAMPLE 2]

ROTARY ELECTRIC MACHINE WITH SEGMENT TYPE OF STATOR WINDING

CROSS-REFERENCE TO RELATED APPLICATION

This application is based on and claims the benefit of priority from earlier Japanese Patent Application No. 2013-073335 filed Mar. 29, 2013, the description of which is incorporated herein by reference.

BACKGROUND OF THE INVENTION

1. Technical Field of the Invention

The present invention relates to a rotary electric machine used in a vehicle, for example, as an electric motor or a generator, and in particular, to a rotary electric machine provided with a segmented type of stator winding.

2. Related Art

Rotary electric machines are used, for example, in vehicles. Such a rotary electric machine includes a rotor and a stator. A well-known stator includes a stator core which is arranged being radially opposed to the rotor and has a plurality of circumferentially arranged slots, and a stator winding which is wound about the stator core such that the conductors of the stator winding are accommodated in the slots and electrically connected to each other.

For example, a patent document JP-A-2009-261189 discloses a stator winding having coil end portions axially projected out of both axial end faces of the stator core. Each of the coil end portions is formed into a staircase pattern to reduce the axial length of the coil end portion that does not operate in a magnetic-circuit manner.

Recently, a small but high-power and high-quality rotary electric machine is sought for use as an electric motor or a generator. For a rotary electric machine installed in a vehicle, the space provided for it is becoming smaller and smaller, while the power of it is required to be enhanced more and more. In particular, a rotary electric machine used in a vehicle is arranged being coaxial with the dual mass flywheels, the engine, the gears and the like and hence there are more strict needs in reducing the size in the axial direction.

SUMMARY

Hence it is desired to provide a rotary electric machine with a stator winding whose coil end portions have smaller axial length to further ensure reduction of the size.

An exemplary embodiment provides a rotary electric machine including a rotor arranged rotatably on a central axis, the central axis being defined as an axial direction, a radial direction extending radially from the central axis in a plane perpendicular to the axial direction, a circumferential direction being around the central axis in the plane; a stator provided with i) a stator core arranged to be opposed to the rotor with a gap between the stator and the rotor in the axial direction, wherein a plurality of slots are arrayed in the stator core in the circumferential direction and formed to have an opening opened toward the rotor, and ii) a stator winding wound at the stator core, the stator winding including a plurality of conductors each having in-slot portions, being electrically connected with each other, and having a rectangular section in a length-wise direction of each of the conductors, the in-slot portions being accommodated in a corresponding one of the slots of the stator core such that the in-slot portions are stacked therein in the radial direction and runs in the axial direction; and a wedge having two edges and a length ranging from one of the edges to the other, wherein the wedge is inserted between the in-slot portions stacked in each of the slots and a wall of each of the slots such that both end portions of the conductors are tilted relative to the rotor so as to be oriented oppositely to the rotor in the radial direction, the wall being located oppositely to the opening, the tilted end portions starting from each of the two edges of the wedge in the axial direction, the length of the wedge being smaller than an axial length of the stator core in the axial direction.

According to the configuration, both axial end portions of the plurality of the conductors, whose in-slot portions are stacked in each slot in the radial direction, are tilted so as to be oriented oppositely to the rotor, starting from respective axial edges of the wedge. Thus, coil end portions of the stator winding, which are axially projected out of both axial end faces of the stator core, will have an axial height that can be reduced according to the angle of tilting (tilting angle) of both axial end portions of the conductors. Accordingly, the overall length of the stator, which is composed of the axial length of the stator core and the axial height of the coil end portions, is reduced to thereby reduce the size of the stator.

In the present invention, the wedge inserted into each slot has a length equal to or smaller than the axial length of the stator core. As the axial length of the wedge is reduced (as the position of each axial end portion of the wedge comes closer to the axial center of the slot), the starting point at which the axial end portions of the conductors are tilted also comes closer to the axial center of the slot. Therefore, the tilting angle of the axial end portions of the conductors is increased and hence the axial height of each coil end portion is decreased. However, a maximum tilting angle is achieved when the tilted axial end portions of the conductors come into contact with a corner (edge) of each axial end portion of the slot. Therefore, the maximum tilting angle depends on the radial length (thickness) of the wedge.

The reference symbols in brackets for the elements set forth above or in the claims indicate correlation of the elements to the specific means described in the embodiments provided below.

DETAILED DESCRIPTION OF THE PREFERRED EMBODIMENTS

With reference to the accompanying drawings, hereinafter are described some embodiments of the present invention. In the description provided below, when a term "connection" is used, it refers to "electrical connection" unless explicitly defined. The same applies to the inflected forms of the term "connection". Further, the accompanying drawings include elements required for describing the invention and do not necessarily include all the actually mounted elements.

First Embodiment

Figure 1:
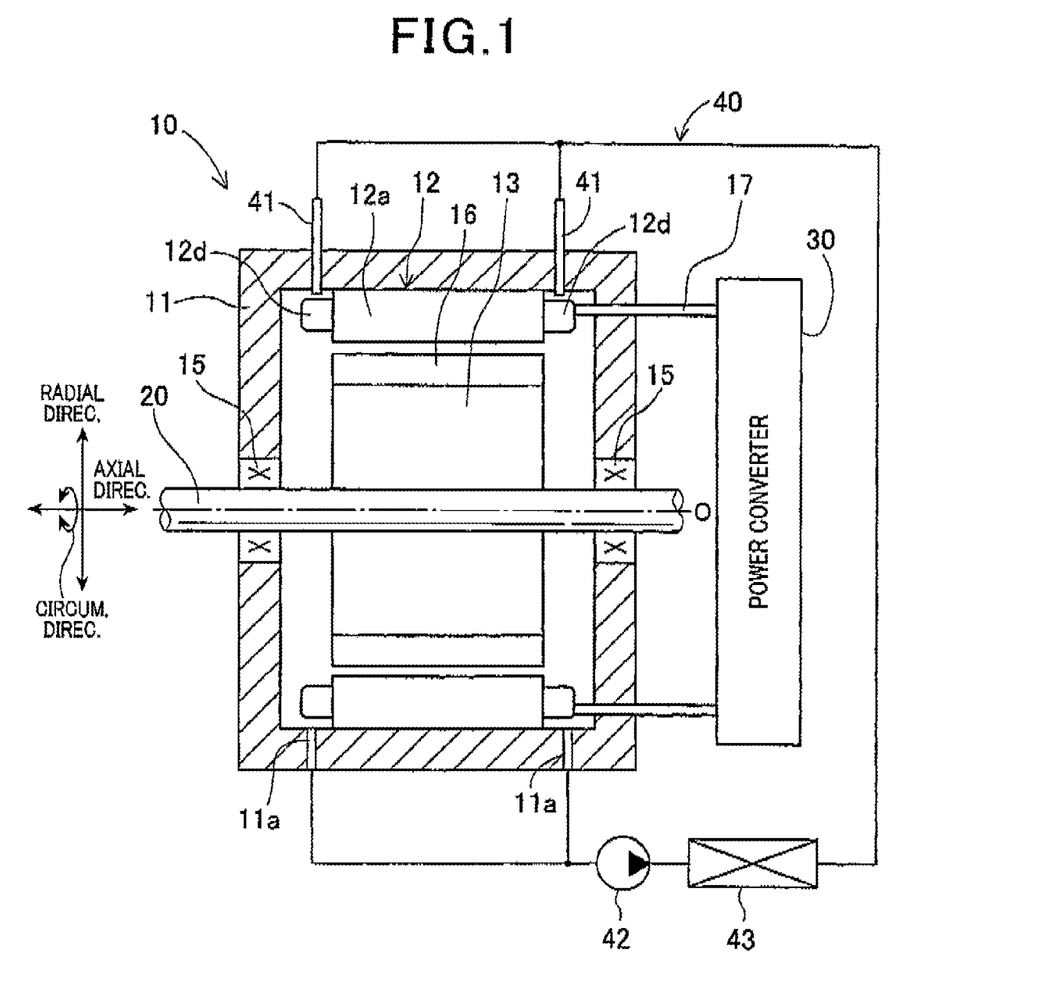
FIG. 1 is an axial schematic cross-sectional view illustrating a rotary electric machine, according to a first embodiment of the present invention.

Referring to FIGS. 1 to 9B, hereinafter is described a first embodiment of the present invention. FIG. 1 is an axial schematic cross-sectional view illustrating a rotary electric machine 10 according to the first embodiment. The rotary electric machine 10 of the present embodiment is an example of an inner-rotor type rotary electric machine. As shown in FIG. 1, the rotary electric machine 10 includes a casing 11, stator 12, rotor 13, rotary shaft 20, power converter 30 and refrigerant supply means 40. The rotary electric machine 10 and the power converter 30 are connected to each other via an input/output line 17 or the like. The casing 11 of the rotary electric machine 10 may be formed separately from the casing (not shown) of the power converter 30 and the separate casings may be fixed to each other using a fixing means. Alternatively, these casings may be integrally formed. When the casings are separately formed, the fixing means corresponds to a joint which is formed, for example, by using bolts and nuts, external threads and internal threads, through holes and split pins, or welding, or corresponds to crimping of edges, or the like. Of these joints and crimping, two or more may be appropriately selected and combined to achieve fixation. The input/output line 17 may be formed by extending a conductor segment 18 described later.

In the rotary electric machine 10, as illustrated in FIG. 1, three directions can be defined. The rotary shaft 20 can be rotated on a central axis (rotation axis) O, so that the central axis O can be defined as an axial direction. A radial direction extends radially from the central axis O in an imaginary plane perpendicular to the axial direction and a circumferential direction is around the central axis in the plane.

The rotary shaft 20 is rotatably supported by the casing 11 via bearings 15. The rotary shaft 20 may be fixed to a center portion of the rotor 13 using the fixing means mentioned above, or may be integrally formed with the rotor 13. Whichever of the configurations may be used, the rotary shaft 20 rotates cooperatively with the rotor 13. The rotor 13 has an outer peripheral portion in which permanent magnets 16 are embedded along the circumferential direction so that the polarities are alternated. In the rotor 13 of the present embodiment, the number of poles is eight (four N poles and four S poles).

Figure 2:
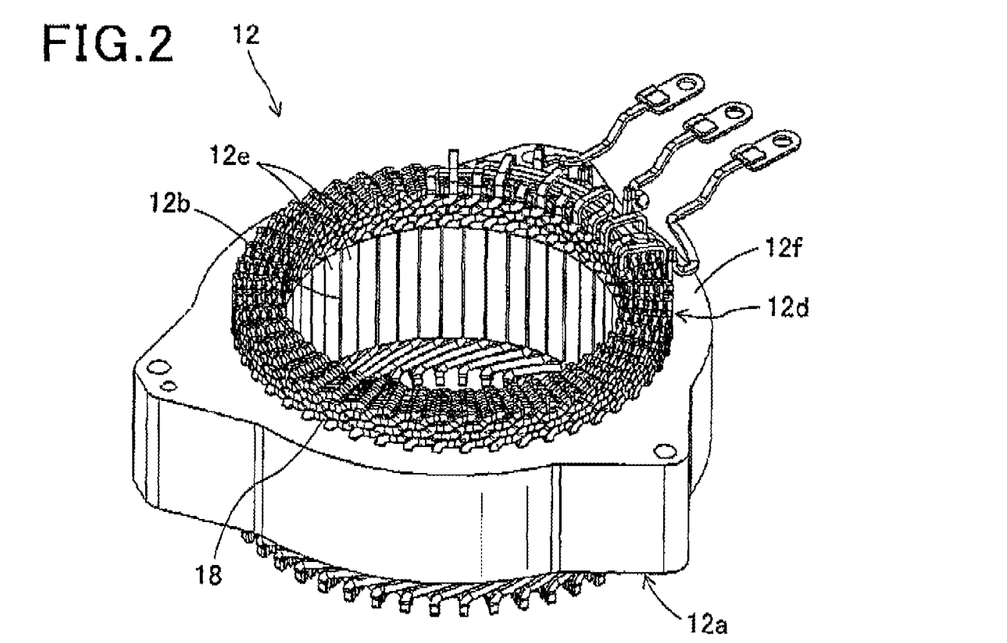
FIG. 2 is a perspective view illustrating a stator as viewed from a conductor segment insertion side, according to the first embodiment.

FIG. 2 is a perspective view illustrating the stator 12. As shown in FIG. 2, the stator 12 includes an annular stator core 12a and a stator winding 12d. The stator core 12a is arranged on an outer peripheral side of the rotor 13 so as to be radially opposed to the rotor 13. The stator winding 12d is wound about the stator core 12a. The stator core 12a of the stator 12 is fixed to the casing 11 by the fixing means mentioned above so that the inner peripheral surface of the stator core 12a will be opposed to the outer peripheral surface of the rotor 13.

The stator core 12a has a plurality of slots 12b which are formed throughout the stator core 12a in the axial direction and arranged in the circumferential direction along the inner peripheral surface of the stator core 12a. The slots 12b are formed such that their openings are provided in the inner peripheral surface of the stator core 12a and their depth direction coincides with the radial direction of the stator core 12a. The circumferential interval of the slots 12b may be optionally determined. However, the slots 12b may preferably be arranged at regular intervals, taking account of uniforming the flow of magnetic flux and increasing torque. Teeth 12e are each arranged between adjacent slots 12b.

The example of the slots 12b shown in FIG. 2 has a slot factor of two as indicated by S (S is a positive integer), a pole number (the number of poles) of eight in the rotor 13 as indicated by Mn (Mn is a positive integer), and a phase number (the number of phases) of three as indicated by p (p is a positive integer). In this example, the number of slots 12b (slot number Sn) is expressed by: $Sn=S \times Mn \times p=2 \times 8 \times 3=48$. The conductor segments 18 configuring the stator winding 12d are accommodated in each slot 12b. Each slot 12b accommodates a plurality of (six in the present embodiment) conductors (conductor segments 18) which are stacked and arrayed in a line in the radial direction (see FIG. 5).

Figure 3:
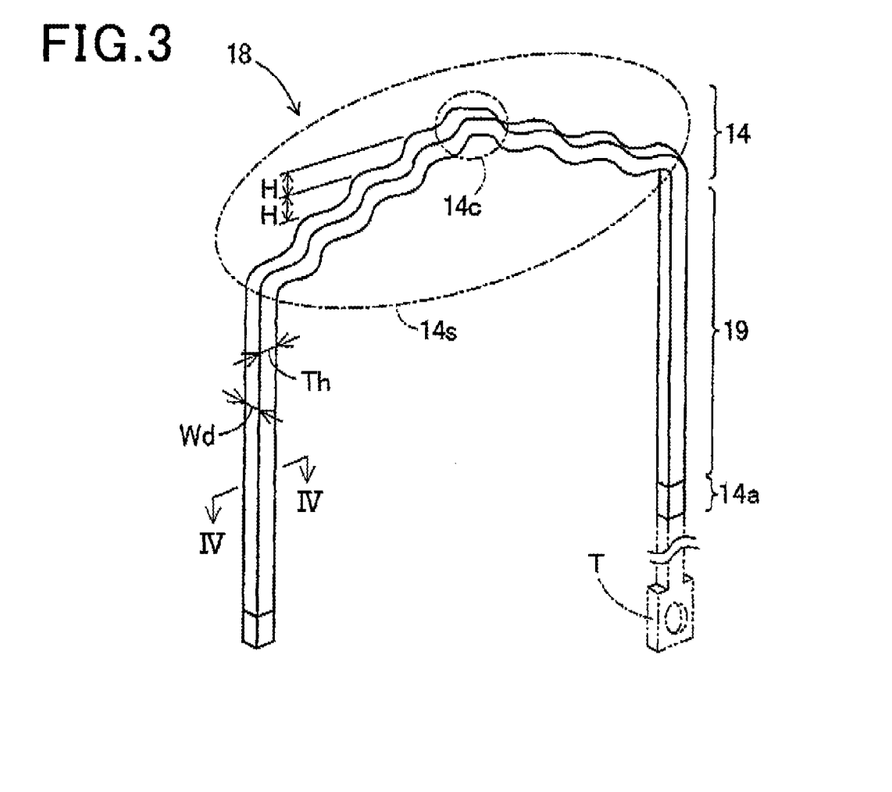
FIG. 3 is a perspective view illustrating a conductor segment that configures a stator winding, according to the first embodiment.

FIG. 3 is a perspective view illustrating the conductor segment 18. As shown in FIG. 3, the conductor segment 18 is formed into an approximate shape of U and includes a turn portion 14, in-slot portions 19 and end portions 14a. The turn portion 14 is formed with a staircase-pattern part 14s composed of a plurality of steps. Each step of the staircase-pattern part 14s has a height H which may be optionally set. When the height H is made approximately equal to the height (i.e. thickness Th) of the conductor segment 18, the conductor segments 18 will be easily stacked in the radial direction. The number of steps of the staircase-pattern part 14s may be optionally determined. For example, the number of steps may be set to a value suitable for the width of the in-slot portion 19.

The staircase-pattern part 14s has a center portion in which a crank part 14c is formed by bending the center portion into a crank shape. The crank part 14c is formed for the purpose of offsetting the conductor segment 18 in the radial direction. In the crank part 14c, the height of projection of the conductor segment from an axial end face 12f of the stator core 12a is a maximum. The amount of offset in the radial direction may be optionally determined. When the amount of offset is made approximately equal to a width Wd of each conductor segment 18, the plurality of conductor segments 18 can be easily offset in the radial direction. The conductor segment 18 does not necessarily need to have a staircase pattern but may include only the crank part 14c.

Some of the conductor segments 18 are provided with a terminal T at the end portion 14a as indicated by the dash-dot-dot line in FIG. 3. Joint between the end portions 14a or between the end portion 14a and the terminal T may desirably be achieved by soldering, welding, or the like. Welding includes fusion welding (e.g., gas welding, arc welding, electro-slag welding and laser-beam welding) and pressure welding (e.g., resistance welding and forge welding).

Figure 4:
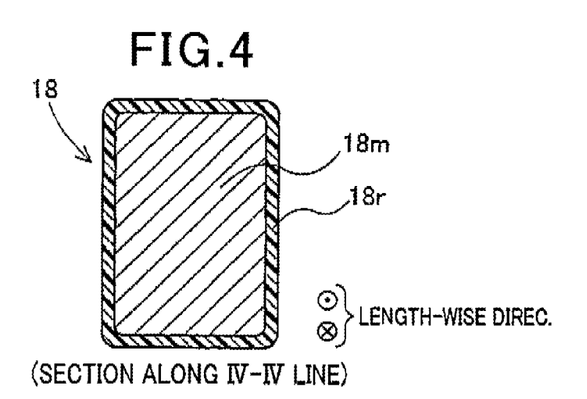
FIG. 4 is a cross-sectional view illustrating the conductor segment, taken along a line IV-IV of FIG. 3, according to the first embodiment.

FIG. 4 shows a cross section of the conductor segment 18, taken along a line IV-IV of FIG. 3. In the conductor segment 18, the turn portion 14 and the in-slot portion 19 are ensured to have insulation property by providing an insulating film 18r (e.g., resin) over an electrically conductive metal member 18m (e.g., copper wire) that configures the conductor segment 18. On the other hand, the end portions 14a of the conductor segment 18 are not provided with an insulating film but the metal member 19m is exposed to establish connection.

The conductor segments 18 are sequentially accommodated in a series of slots 12b according to a predetermined arrangement order. In this case, the conductor segments 18 are stacked in the slots 12b on a phase basis, i.e. for each of U phase, V phase and W phase. The end portions 14a are connected to each other, or the end portion 14a and the terminal T are connected to each other to form either a Y (star) connection, a Δ (delta) connection or a mixed Y-Δ connection to thereby form the stator winding 12d wound about the stator core 12a.

Figure 5:
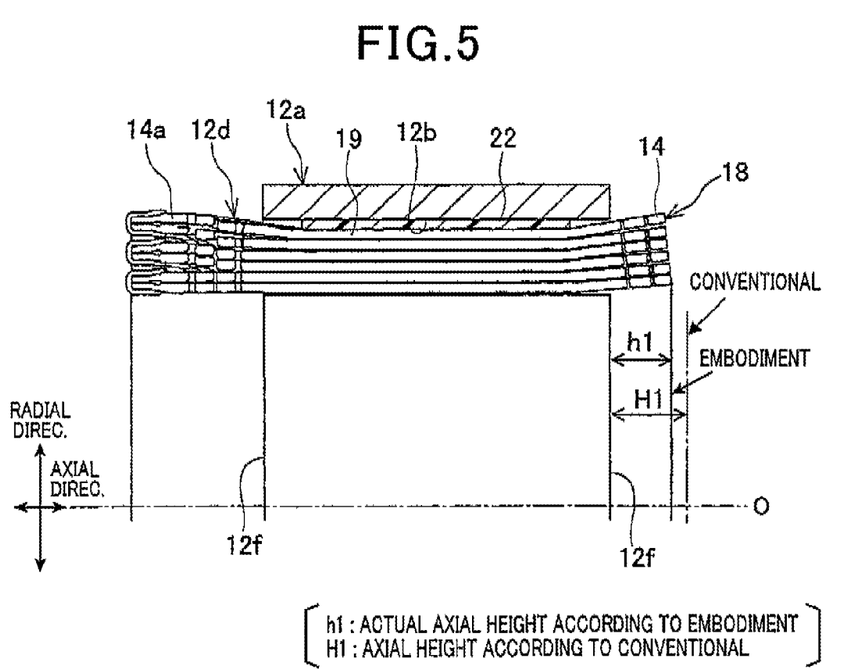
FIG. 5 is a partial cross-sectional view illustrating a principal part of the stator, according to the first embodiment.

FIG. 5 is a partial cross-sectional view illustrating a principal part of the stator 12. As shown in FIG. 5, the in-slot portions 19 of a plurality of axially extending (six in the present embodiment) conductor segments 18 are accommodated in all of the slots 12b, being stacked in a line in the radial direction, except for an optionally selected one slot 12b. A part of each conductor segment 18 axially projecting out of an end face of each slot 12b of the stator core 12a forms the turn portion 14 (see FIG. 3). The turn portions 14 are also collectively referred to as a coil end portion. As shown in FIG. 1, some of the turn portions are extended as a lead and connected to the power converter 30.

As shown in FIG. 5, a wedge 22 is inserted into each slot 12b so as to be located on a radially outer side (on a side opposite to the rotor 13) of the slot and be in surface contact with the conductor segment 18 located at a radially outermost position. The wedge 22 is a plate member formed to have a predetermined narrow rectangular shape, so that the wedge 22 has a rectangular cross section when viewed in a plane across a length-wise direction thereof. In addition the wedge 22 has a circumferential width which is slightly smaller than the circumferential width of the slot 12b, a thickness which is approximately equal to the width Wd of the conductor segment 18 (refer to FIG. 3), and an axial length which is equal to or smaller than the axial length of the stator core 12a. The wedge 22 may desirably be made of a non-magnetic material having a predetermined rigidity or hardness. For example, preferable non-magnetic material that can be used as the wedge 22 includes polyphenylenesulfide (PPS), a fluorine resin, a liquid-crystal polymer (LCP) or a resin reinforced by a glass filler.

Figure 6:
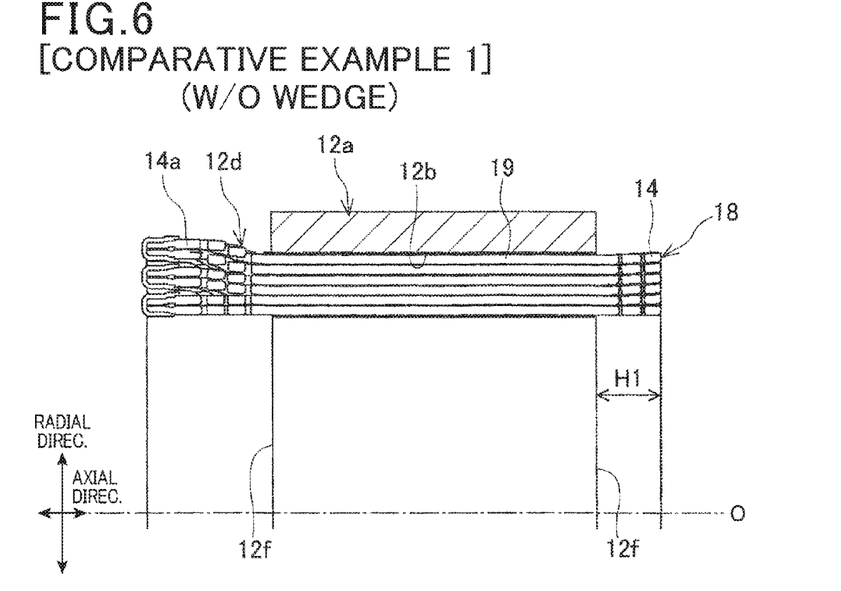
FIG. 6 is a partial cross-sectional view illustrating a principal part of a stator, according to Comparative Example 1.

Using the wedge 22, both axial end portions of the six conductor segments 18, of which in-slot portions 19 are radially stacked in the slot 12b, are tilted radially outward (i.e., tilted relative to the rotor 13 so as to be oriented oppositely to the rotor 13) starting from respective axial edges of the wedge 22. Thus, the coil end portions (turn portions 14) of the stator winding 12d, which are axially projected out of both axial end faces 12f of the stator core 12a have an axial height h1 that has been reduced according to the tilting angle of the axial end portions of the six stacked conductor segments 18. FIG. 6 is a partial cross-sectional view illustrating a principal part of a stator according to Comparative Example 1 in which the wedge 22 is absent from the slot 12b and each coil end portion (turn so portions 14) has an axial height H1. As will be understood from the comparison of the coil end portions shown in FIG. 5 and those shown in FIG. 6, the axial height h1 of the coil end portions shown in FIG. 5 are made smaller than the axial height H1 of the coil end portions shown in FIG. 6.

Referring to FIGS. 7A, 7B, 8A and 8B, hereinafter is described a process of tilting the axial end portions of the six conductor segments 18 in a radially outward direction (i.e., tilted so as to be oriented oppositely to the rotor 13), the in-slot portions 19 of the conductor segments 18 being radially stacked in the slot 12b, the tilting starting from respective axial edges of the wedge 22. For simplicity's sake, FIGS. 7A, 7B, 8A and 8B show an example in which the in-slot portions 19 of the four conductor segments 18 are stacked in the radial direction in the slot 12b.

Figure 7A:
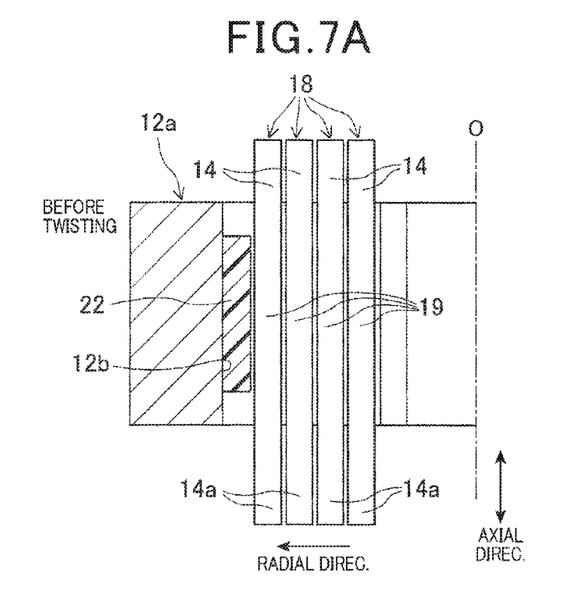
FIG. 7A is a partial cross-sectional view illustrating a principal part of the stator, with a plurality of conductor segments stacked in a slot being in a state before twisting, according to the first embodiment.
Figure 7B:
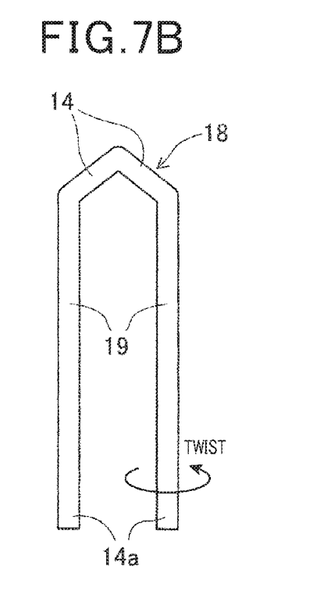
FIG. 7B is a front view illustrating one of the plurality of conductor segments stacked in the slot being in a state before twisting, according to the first embodiment.

As shown in FIG. 7A, the in-slot portions 19 of the plurality of conductor segments 18 are inserted into the slot 12b from one axial end side (from the upper side as viewed in FIG. 7A) so as to be stacked in the radial direction. The inserted conductor segments 18 are then projected out of the end face 12f of the stator core 12a on the other axial end side (from the lower side as viewed in FIG. 7A). The projected end portions 14a of the conductor segments 18 are subject to twisting to thereby twist the end portions 14a in the circumferential direction. After that, the end portions of predetermined conductor segments 18 are electrically connected by performing welding or the like to thereby wind the conductor segments 18 (the stator winding 12d) about the stator core 12a.

In this case, both axial end portions 14a of the six conductor segments 18 of which in-slot portions 19 are radially stacked in the slot 12b are tilted radially outward (i.e., tilted so as to be oriented oppositely to the rotor 13) by the twisting force in performing twisting. Specifically, as shown in FIG. 7A, before twisting is performed, the wedge 22 is inserted into the slot 12b in the present embodiment so as to be located on a radially outer side in the slot. The wedge 22 is formed to have an axial length equal to or smaller than the axial length of the stator core 12a.

Figure 8A:
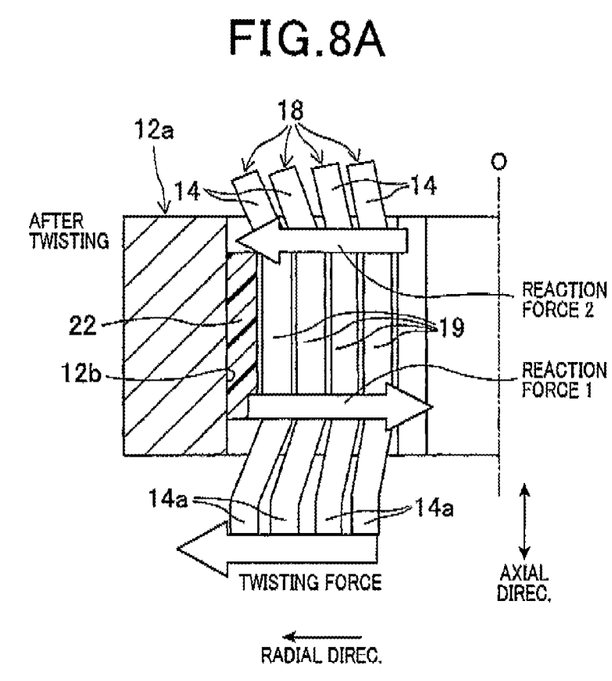
FIG. 8A is a partial cross-sectional view illustrating a principal part of the stator, with the plurality of conductor segments stacked in the slot being in a state after twisting, according to the first embodiment.
Figure 8B:
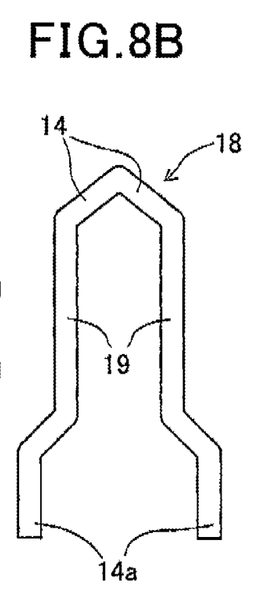
FIG. 8B is a front view illustrating one of the plurality of conductor segments stacked in the slot being in a state after twisting, according to the first embodiment.

After that, as shown in FIG. 8A, a twisting force acting radially outward (leftward as viewed in FIG. 8A) is applied to the end portions 14a of the conductor segments 18. Thus, a reaction force 1 is generated radially inward (rightward as viewed in FIG. 8A) at an axial end portion (lower end portion as viewed in FIG. 8A) of the wedge 22. Being caused by the reaction force 1, the end portions 14a are tilted radially outward (leftward as viewed in FIG. 8A) starting from an axial end portion (lower end portion in FIG. 8A) of the wedge 22. At the same time, a reaction force 2 is generated radially outward (leftward as viewed in FIG. 8A) at the other axial end portion (upper end portion as viewed in FIG. 8A) of the wedge 22. Being caused by the reaction force 2, the heads of the turn portions 14 are tilted radially outward (leftward as viewed in FIG. 8A) starting from the other axial end portion (upper end portion as viewed in FIG. 8A) of the wedge 22.

The end portions 14a of the predetermined conductor segments 18 are connected by performing welding or the like and then subject to insulating using a powdered resin or the like. Therefore, the coil end portion on the end portion 14a side has a radial thickness which is larger than the coil end portion on the turn portion 14 side. Thus, the effect of reducing the axial height of the coil end portion is lower on the end portion 14a side compared to that on the turn portion 14 side. However, the axial height h1 of the coil end portion on the turn portion 14 side is sufficiently reduced and thus sufficient reduction can be achieved in the stator's overall axial length composed of the axial length of the stator core 12a and the axial height h1 of the coil end portions.

The six conductor segments 18 (in-slot portion 19) accommodated in each slot 12b are electrically insulated from the stator core 12a by a piece of insulating paper (not shown) which is arranged along the wall surface of the slot 12b. Further, the six conductor segments 18 accommodated in each slot 12b are fixed to the stator core 12a together with the insulating paper by an adhesive material (not shown) that has been filled in the slot 12b and solidified.

Hereinafter is described the refrigerant supply means 40 that supplies liquid refrigerant to the stator 12. As shown in FIG. 1, the liquid refrigerant supply means 40 of the present embodiment includes nozzles 41, a pump 42 and a radiator 43. The nozzles 41 drop liquid refrigerant (not shown) onto the coil end portions of the stator winding 12d. The pump 42 feeds liquid refrigerant to the nozzles 41. The radiator 43 discharges heat of the heated liquid refrigerant. The nozzles 41, the pump 42 and the radiator 43 are connected via piping for feeding liquid refrigerant and are set up on a circulation circuit of the liquid refrigerant.

In the present embodiment, the liquid refrigerant discharged from the pump 42 is fed to the nozzles 41 via the radiator 43 and dropped onto the turn portions 41 (coil end portion) of the stator winding 12d from the nozzles 41. The dropped liquid refrigerant goes down along the stator winding 12d, while refrigerating the stator 12, falls on the bottom portion of the casing 11 and returns to the pump 42 through outlet ports 11a formed in the bottom portion. After that, the liquid refrigerant is ensured to be again discharged from the pump 42 to circulate through the circulation circuit.

The rotary electric machine 10 configured as described above operates as follows. In FIG. 1, the stator 12 is excited on the basis of the power-converted drive current supplied from the power converter 30. The excitation generates rotating torque (including motive power) to thereby rotate the rotor 13. In this case, the rotary electric machine 10 operates as an electric motor. The generated rotating torque is outputted to rotating bodies (e.g., wheels or propellers) via the rotor 13 and rotary shaft 20. A motive power transmission mechanism may be interposed between the rotary shaft 20 and the rotating bodies. For example, the motive power transmission mechanism includes one or more of a shaft, a cam, a rack-and-pinion, and a gear.

When the power converter 30 does not output a power conversion signal and the rotating bodies generate torque (including motive power), the rotor 13 also rotates receiving the torque of the rotating bodies. Accordingly, counter electromotive force is generated in the conductor segments 18 of the stator 12. The generated counter electromotive force (re-generative electric power) can be charged into a battery via the power converter 30. In this case, the rotary electric machine 10 operates as a generator.

In this way, whether the rotary electric machine 10 operates as an electric motor or as a generator, the conductor segments 18 of the stator 12 are supplied with current and generate heat.

In the present embodiment, concurrently with the start of operation of the rotary electric machine 10 as an electric motor or as a generator, the refrigerant supply means 40 also starts operation. Thus, the liquid refrigerant discharged from the pump 42 is dropped onto the coil end portions of the stator winding 12d from the nozzles 41.

In this case, the liquid refrigerant dropped onto the coil end portions goes down along the conductor segments 18 of the stator winding 12d and reaches an axial opening of each slot 12b. Since both axial end portions of the six conductor segments 18 of which in-slot portions 19 are radially stacked in each slot 12b is tilted radially outward, the liquid refrigerant that has reached the axial opening of the slot 12b goes along the tilted portions and flows into the slot 12b. Thus, the conductor segments 18 accommodated in each slot 12b and the stator core 12a are efficiently refrigerated.

As described above, according to the rotary electric machine 10 of the present embodiment, both of the axial end portions of the plurality of conductor segments 18, of which in-slot portions 19 are radially stacked in each slot 12b, are tilted radially outward (i.e., tilted so as to be oriented oppositely to the rotor 13) starting from respective axial edges of the wedge 22. Thus, the axial height h1 of the coil end portions of the stator winding 12d can be reduced according to the tilting angle of both axial end portions of the conductor segments 18, the coil end portions being axially projected out of both axial end faces of the stator core 12a. As a result, the overall length of the stator, which is composed of the axial length of the stator core 12a and the axial height h1 of the coil end portions, is reduced to thereby reduce the size of the stator.

The stator winding 12d of the present embodiment wound about the stator core 12a is configured by a segment type winding. Specifically, in this segment type winding, the conductor segments 18 are inserted into each slot 12b and axially projected out of the end face 12f of the stator core 12a, with the projected end portions being subject to twisting to twist the end portions in the circumferential direction. Thus, using the twisting force in performing the twisting, both axial end portions of the plurality of conductor segments 18 of which in-slot portions 19 are radially stacked in the slot 12b can be tilted radially outward. Accordingly, the axial height h1 of the coil end portions of the stator winding 12d is simply and easily reduced.

The rotary electric machine 10 of the present embodiment is provided with the refrigerant supply means 40. As described above, the stator 12 of the rotary electric machine 10 has a configuration in which both axial end portions of the plurality of conductor segments 18 of which in-slot portions 19 are radially stacked in each slot 12b are tilted radially outward. With this configuration, the liquid refrigerant supplied to the stator winding 12d (stator 12) by the refrigerant supply means 40 is permitted to flow into the individual slots 12b to efficiently refrigerate the stator 12. Accordingly, the effect of refrigeration is more enhanced compared to the segment type winding based on conventional art (see FIG. 6).

Second Embodiment

Referring to FIGS. 9A and 9B to 14, hereinafter is described a rotary electric machine 10 according to a second embodiment of the present invention. In the second embodiment, the components identical with or similar to those in the first embodiment are given the same reference numerals for the sake of omitting unnecessary explanation.

The basic configuration of the rotary electric machine 10 of the second embodiment is the same as that of the rotary electric machine 10 according to the first embodiment. However, the rotary electric machine 10 of the present embodiment includes a stator A12 with a configuration different from that of the stator 12 of the first embodiment. The rotary electric machine 10 of the present embodiment is described focusing on the differences.

Figure 9A:
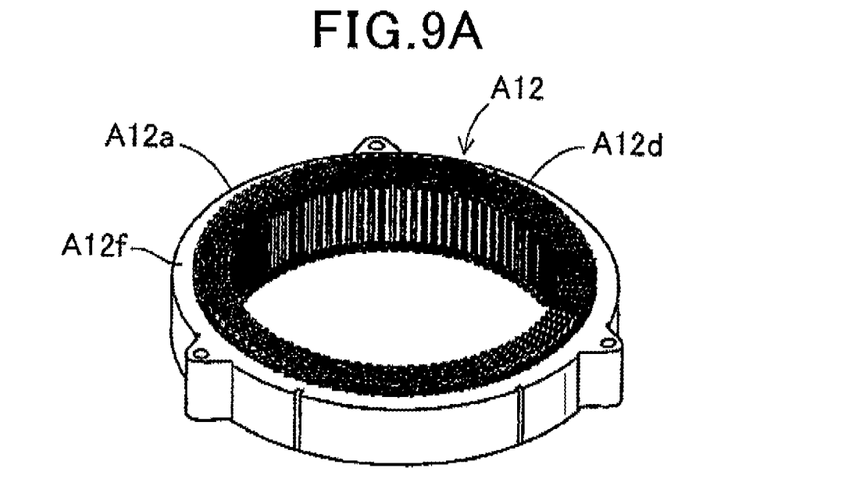
FIG. 9A is a perspective view illustrating an appearance of a stator, according to a second embodiment of the present invention.
Figure 9B:
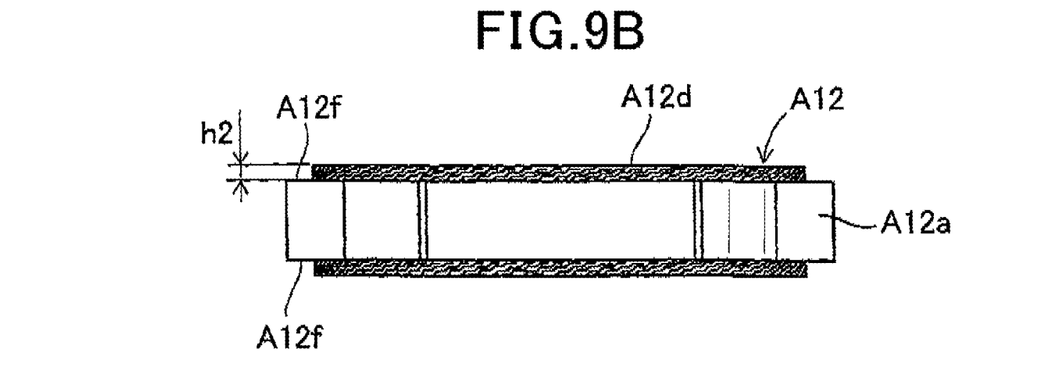
FIG. 9B is a side view illustrating the stator according to the second embodiment.

FIG. 9A is a perspective view illustrating an appearance of the stator A12 of the second embodiment. FIG. 9B is a side view of the stator 12A. As shown in FIGS. 9A and 9B, the stator A12 of the second embodiment includes an annular stator core A12a and a stator winding A12d. The stator core A12a is arranged radially outward of the rotor 13 so as to be opposed to the outer peripheral surface of the rotor 13. The stator winding A12d is wound about the stator core A12a. Specifically, similar to the first embodiment, the stator A12 is fixed to the casing 11 such that the inner peripheral surface of the stator core A12a is opposed to the outer peripheral surface of the rotor 13.

The stator core A12a has a plurality of slots A12b that are formed throughout the stator core in the axial direction and arrayed in the circumferential direction along the inner peripheral surface of the stator core. The slots A12b are formed so as to open in the inner peripheral surface of the stator core A12a, with their depth direction being ensured to coincide with the radial direction of the stator core A12a. The stator core A12a is also provided with forty-eight slots A12b which are formed in a manner similar to the first embodiment and arranged at regular intervals in the circumferential direction.

Figure 10:
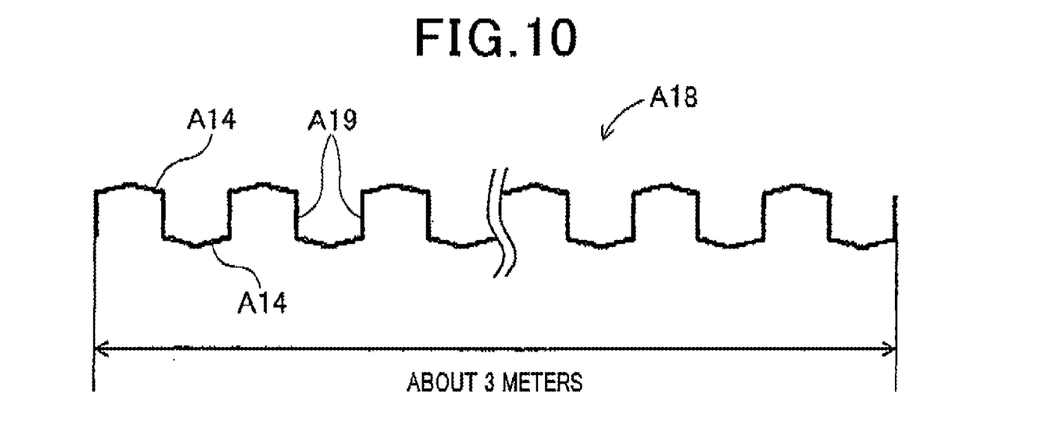
FIG. 10 is a front view illustrating a general shape of a conductor wire configuring a stator winding, according to the second embodiment.

FIG. 10 is a front view illustrating a general shape of a conductor wire A18 configuring the stator winding A12d. A plurality of conductor wires A18 are woven using a given method to form the stator winding A12d having three phases (U phase, V phase and W phase). The stator winding A12d obtained in this way is wound about the stator core A12a in wave winding. Each of the conductor wires A18 configuring the stator winding A12d is a flat wire having a rectangular cross section perpendicular to the longitudinal direction. As shown in FIG. 10, the conductor wire A18 is a continuous wire in which a plurality of turn portions A14 and a plurality of in-slot portions A19 are alternately formed at a predetermined pitch. A single conductor wire A18 has a length of about 3 m. Similar to the first embodiment, the turn portions A14 and the in-slot portions A19 of each of the conductor wire A18 are ensured to have insulation property. Thus, the conductor wire A18 is obtained by coating the electrically conductive metal member 18m with the insulating film 18r (see FIG. 4).

Figure 11:
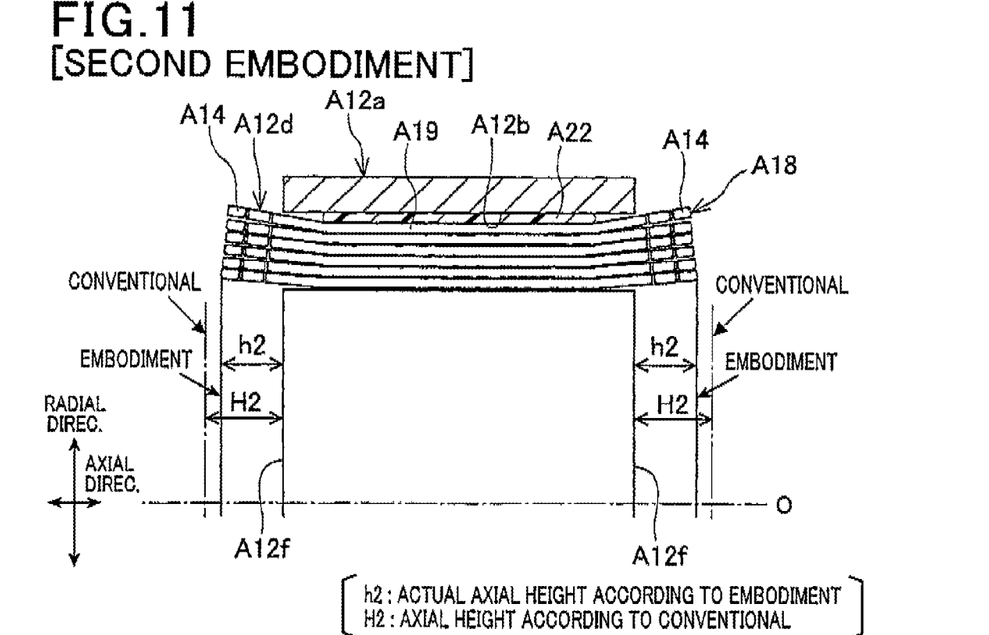
FIG. 11 is a partial cross-sectional view illustrating a principal part of the stator, according to the second embodiment.

FIG. 11 is a partial cross-sectional view illustrating a principal part of the stator A12. As shown in FIG. 11, in-slot portions A19 of a plurality of (six in the present embodiment) conductors (conductor wires A18) extending in the axial direction are accommodated in each slot A12b in a state of being stacked in a line in the radial direction. A wedge A22 is inserted into each slot A12b and located on a radially outer side (on a side opposite to the rotor 13) of the slot, in a state of being in surface contact with the conductor wire A18 (in-slot portion A19) located at a radially outermost position. The wedge A22 is formed in a manner similar to the first embodiment and is in a narrow rectangular shape.

Figure 12:
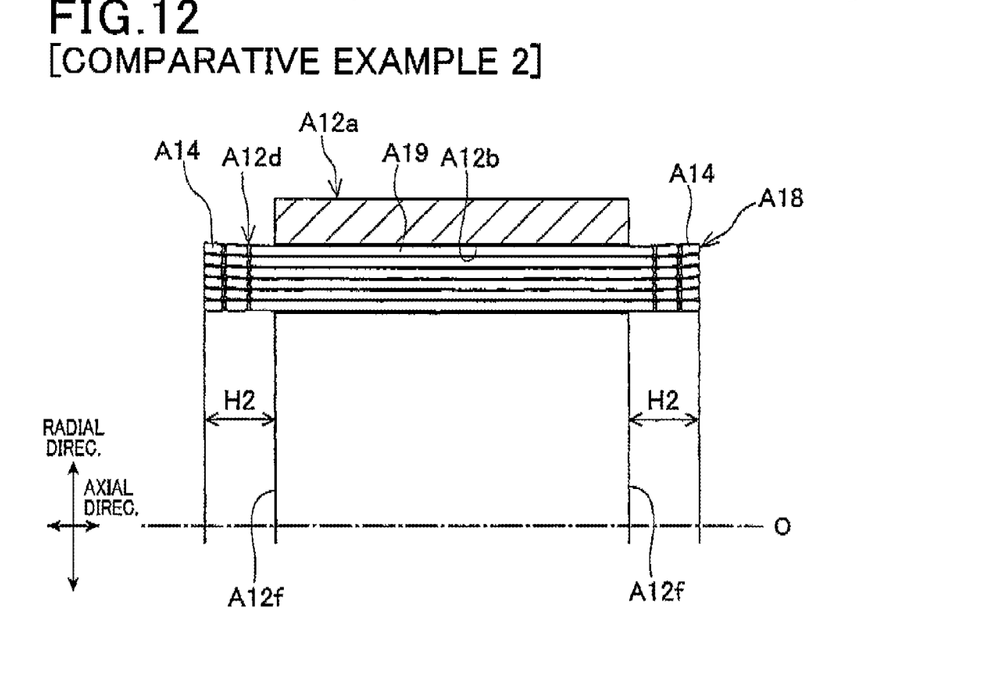
FIG. 12 is a partial cross-sectional view illustrating a principal part of a stator, according to Comparative Example 2.

Using the wedge A22, both axial end portions of the six conductor wires A18, of which in-slot portions A19 are radially stacked in each slot A12b, are tilted radially outward (i.e., tilted so as to be oriented oppositely to the rotor 13) starting from respective axial edges of the wedge A22. Thus, the coil end portions (turn portions A14) of the stator winding A12d radially projected out of both axial end faces A12f of the stator core A12a have an axial height h2 that has been reduced according to the tinting angle of both axial end portions of the six conductor wires A18 of which in-slot portions A19 are radially stacked in the slot. FIG. 12 is a partial cross-sectional view illustrating a principal part of a stator according to Comparative Example 2 in which the wedge A22 is absent from the slot A12b and the coil end portions (turn portions A14) have an axial height H2. As will be understood from the comparison of the coil end portions shown in FIG. 11 and those shown in FIG. 12, the axial height h2 of the coil end portions shown in FIG. 11 is made smaller than the axial height H2 of the coil end portions shown in FIG. 12.

Figure 13:
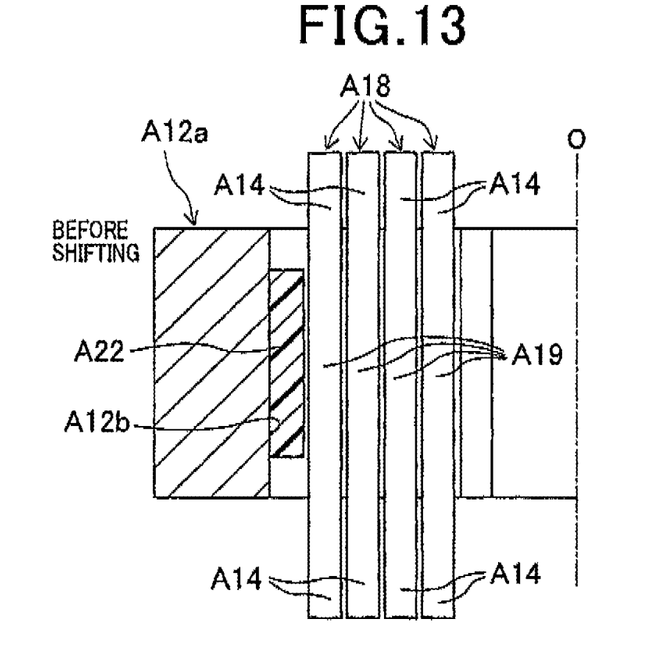
FIG. 13 is a partial cross-sectional view illustrating a principal part of the stator, with a plurality of conductors stacked in a slot being in a state before shifting, according to the second embodiment.
Figure 14:
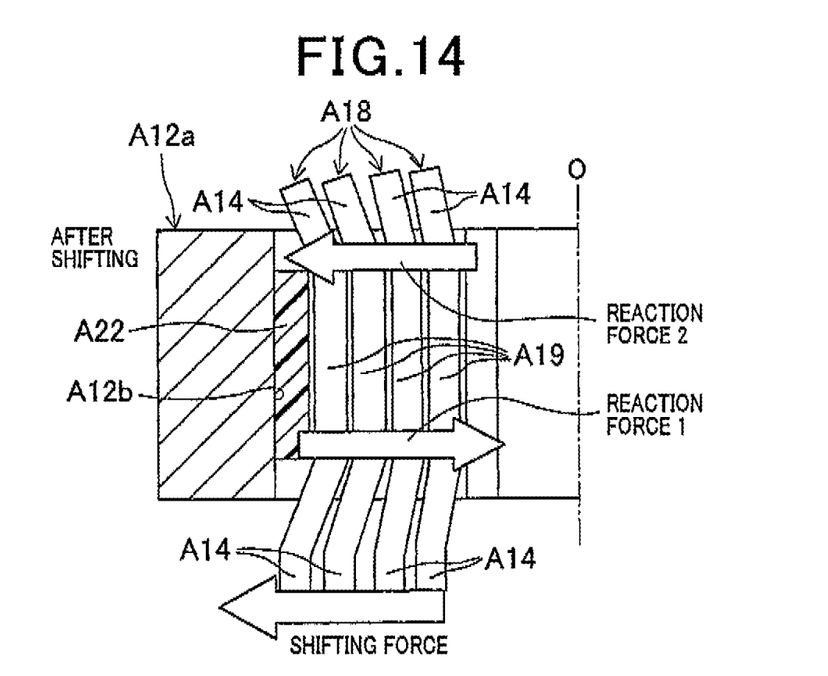
FIG. 14 is a partial cross-sectional view illustrating the principal part of the stator, with the plurality of conductors stacked in the slot being in a state after shifting, according to the second embodiment.

Referring to FIGS. 13 and 14, hereinafter is described a process of tilting both axial end portions, i.e. heads of the turn portions A14, of the six conductor wires A18 (in-slot portions A19) in a radially outward direction, the in-slot portions A19 of the conductor wires A18 being radially stacked in each slot A12b, the tilting starting from respective axial edges of the wedge A22. For simplicity's sake, FIGS. 13 and 14 show an example in which four conductor wires A18 (in-slot portions A19) are stacked in the radial direction in each slot A12b.

In the second embodiment, before the stator winding A12d is wound about the stator core A12a, the wedge A22 is inserted into each slot A12b so as to be located on a radially outer side. After that, as shown in FIG. 13, the plurality of conductor wires A18 configuring the stator winding A12d are inserted into the slot A12b from an opening A12g of the slot A12b, which is formed on a radially inner side (right side as viewed in FIG. 13 or 14) so that the in-slot portions A19 are stacked in the radial direction.

Then, as shown in FIG. 14, a shifting force acting radially outward (leftward as viewed in FIG. 14) is applied to the turn portions A14 on one axial end side (on lower side as viewed in FIG. 14). The shifting force generates a reaction force 1 acting toward a radially inner side (rightward as viewed in FIG. 14) at one axial end portion (lower end portion as viewed in FIG. 14) of the wedge A22. Then, the heads of the turn portions A14 are tilted radially outward (leftward as viewed in FIG. 14) starting from the one axial end portion (lower end portion as viewed in FIG. 14). At the same time, a reaction force 2 acting radially outward (leftward as viewed in FIG. 14) is generated at the other axial end portion (upper end portion as viewed in FIG. 14) of the wedge A22. Then, the heads of the turn portions A14 are tilted radially outward (leftward as viewed in FIG. 14) starting from the other axial end portion (lower end portion as viewed in FIG. 14).

In the second embodiment as well, the in-slot portions A19 of the six conductor wires A18 accommodated in each slot A12b, are electrically insulated from the stator core A12a by a piece of insulating paper (not shown) which is arranged along the wall surface of the slot A12b. Further, the in-slot portions A19 of the six conductor wires A18 accommodated in each slot A12b are fixed to the stator core A12a together with the insulating paper by an adhesive material (not shown) that has been filled in the slot A12b and solidified.

Similar to the first embodiment, in the second embodiment, concurrently with the start of operation of the rotary electric machine 10 configured as described above as an electric motor or as a generator, the refrigerant supply means 40 also starts operation. Thus, the stator winding A12d that generates heat with the operation of the rotary electric machine 10 is efficiently refrigerated by the liquid refrigerant fed to the stator A12.

As described above, according to the rotary electric machine 10 of the second embodiment, both axial end portions of the plurality of conductor wires A18 (in-slot portions A19) radially stacked in each slot A12b are tilted radially outward (i.e., tilted so as to be oriented oppositely to the rotor 13) starting from respective axial edges of the wedge A22. Thus, similar to the first embodiment, the axial height h2 of the coil end portions of the stator winding A12d can be reduced according to the tilting angle, the coil end portions being axially projected out of both axial end faces A12f of the stator core A12a.

In particular, in the second embodiment, each of the conductor wires A18 configuring the stator winding A12d is a continuous wire in which a plurality of turn portions A14 and a plurality of in-slot portions A19 are alternately formed at a predetermined pitch. Therefore, the axial height h2 of the coil end portions on both axial sides is sufficiently reduced. Accordingly, the overall length of the rotary electric machine 10 is more sufficiently reduced than in the first embodiment, leading to further reduction of the size.

OTHER EMBODIMENTS

The present invention is not limited to the embodiments described above but may be modified in various ways within a range not departing from the spirit of the present invention.

For example, the rotary electric machine 10 in the foregoing embodiments is of liquid-cooling type, which is provided with the refrigeration supply means 40 that supplies liquid refrigerant to the stator 12. However, the present invention may be applied to a rotary electric machine of air-cooling type, which blows air to the stator 12 using a fan or the like. However, the present invention will exert higher cooling effects when applied to a cooling system of liquid-cooling type as in the rotary electric machine 10 of the foregoing embodiments, than to a cooling system of air-cooling type.

In the foregoing embodiments, an inner-rotor type rotary electric machine has been described, in which the rotor 13 is arranged inside the stator 12 or A12. However, the present invention may also be applied to an outer-rotor type rotary electric machine in which the rotor 13 is arranged outside the stator 12 or A12.

In the foregoing embodiments, the stator of the present invention is applied to a rotary electric machine which selectively serves as an electric motor or as a generator. However, the stator of the present invention may also be applied to a rotary electric machine that solely functions as an electric motor or as a generator.

What is claimed is:

1. A rotary electric machine comprising:
   a rotor arranged rotatably on a central axis, the central axis being defined as an axial direction, a radial direction extending radially from the central axis in a plane perpendicular to the axial direction, a circumferential direction being around the central axis in the plane;
   a stator provided with i) a stator core arranged to be opposed to the rotor with a gap between the stator and the rotor in the radial direction, wherein a plurality of slots are arrayed in the stator core in a circumferential direction and formed to have an opening opened toward the rotor, and ii) a stator winding wound at the stator core, the stator winding including a plurality of conductors each having in-slot portions and end portions in the axial direction, the conductors being electrically connected with each other and having a rectangular section crossing a length-wise direction of each of the conductors, the in-slot portions being accommodated in a corresponding one of the slots of the stator core such that the in-slot portions are stacked therein in the radial direction and extend in the axial direction; and
   a wedge having two edges and a length ranging from one of the edges to the other, the length of the wedge being smaller than an axial length of the stator core in the axial direction, wherein;
   the wedge is inserted between the in-slot portions stacked in each of the slots and a wall of each of the slots, the wall being located oppositely to the opening;
   the conductors are twisted; and
   both end portions of the conductors are tilted so as to be oriented oppositely to the rotor in the radial direction, the tilted end portions starting from each of the two edges of the wedge in the axial direction, the tilted end portions contacting the two edges of the wedge and having a part which does not contact the wedge.

2. The rotary electric machine of claim 1, wherein the stator winding is formed as a segmented type of winding wound at the stator, wherein the plurality of conductors are produced as a plurality of approximately U-shaped conductor segments having two end portions, the plurality of conductor segments being inserted and stacked in respective corresponding ones of the slots in the radial direction such that the two end portions of the conductor segments are projected from an axial end face of the stator core in the axial direction, the two end portions being twisted and then electrically connected among given ones of the conductor segments, and
   the twisting is performed such that both axial end portions of the conductor segments are tilted oppositely to the rotor.

3. The rotary electric machine of claim 1, comprising refrigerant supply means for supplying liquid refrigerant to the stator to cool the stator.

4. The rotary electric machine of claim 2, comprising refrigerant supply means for supplying liquid refrigerant to the stator to cool the stator.

5. The rotary electric machine of claim 1, wherein
   the wedge is configured to generate a reaction force at the edge of the wedge, the reaction force acting radially inward, and
   the end portions of the twisted conductors are subjected to the reaction force to be tilted radially outward starting from the edge end portion of the wedge.

* * * * *